United States Patent
Bennett, III et al.

(10) Patent No.: US 8,130,712 B1
(45) Date of Patent: Mar. 6, 2012

(54) MONITORING DATA-USAGE INFORMATION FROM A DUAL-STACK MOBILE DEVICE

(75) Inventors: John H. Bennett, III, Lawrence, KS (US); Jeremy R. Breau, Leawood, KS (US); Terry D. Nebergall, Gardner, KS (US); Frederick C. Rogers, Olathe, KS (US); Dale E. Winn, Adrian, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 606 days.

(21) Appl. No.: 12/365,670

(22) Filed: Feb. 4, 2009

(51) Int. Cl.
*H04W 4/00* (2009.01)

(52) U.S. Cl. ...................................... 370/329

(58) Field of Classification Search .................. 370/329, 370/341; 726/4, 17, 21, 26–30; 713/158–170
See application file for complete search history.

(56) References Cited

U.S. PATENT DOCUMENTS

2008/0104678 A1 * 5/2008 Hsu .................................. 726/4
* cited by examiner

*Primary Examiner* — Derrick Ferris
*Assistant Examiner* — Mang Yeung

(57) ABSTRACT

Methods and computer-readable media are provided to monitor information corresponding to IP data sessions that are established using a single authentication session. A first IP data session may be established in a first IP version, such as IPv4 or IPv6, and a second IP data session may be established using a different IP version that was used in correlation to the first IP data session. Once the second IP data session is established, a message containing information corresponding to the second IP data session may be communicated to a receiving component, such as an AAA server. A similar message may be sent to the receiving component upon a termination of the second IP data session, such that the messages can be used to determine a value, such as a monetary value, associated with the second IP data session. A report may then be created that includes the determined value.

20 Claims, 6 Drawing Sheets

MONITORING DATA-USAGE INFORMATION FROM A DUAL-STACK MOBILE DEVICE

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in isolation to determine the scope of the claimed subject matter.

Embodiments of the present invention provide methods and computer-readable media for, among other things, monitoring various aspects for one or more IP data sessions that have been established using the same authentication session such that the user of the mobile device on which the IP data sessions are established can be properly billed. While a single authentication session eliminates the need to separately authenticate each IP data session that is established on a device, accounting and other components may not be given the information necessary to properly bill the user of the mobile device. To allow various components to properly account for the time and data-usage aspects of an IP data session, a message containing the required information may be sent to a receiving component, such as an accounting component, when an IP data session is established, and when the IP data session is terminated. In one instance, a message may be sent each time an establishment or termination event occurs. In another instance, messages may be sent on predetermined time intervals, such as every 15 seconds, and may include information corresponding to any IP data sessions that have been established or terminated since the previous message was sent.

Accordingly, in one aspect, one or more computer-readable media having computer-useable instructions embodied thereon for performing a method of monitoring data-usage information received from a dual-stack mobile device is provided. The media include, in a first IP version, establishing with the mobile device a first IP data session using a single authentication session, thereby enabling a first flow of data between the mobile device and a packet-routing component. The media also includes, in a second IP version, establishing with the mobile device a second IP data session using the single authentication session, thereby enabling a second flow of data between the mobile device and the packet-routing component. Additionally, the media include incident to establishing the second IP data session, communicating a first IP-session message to a receiving component, and incident to a termination of the second IP data session, communicating a second IP-session message to the receiving component. Further, the media include utilizing the first and second IP-session messages to determine a value associated with the second IP data session, and based on the value, creating a report that includes an expression of the value.

In another aspect, one or more computer-readable media having computer-useable instructions embodied thereon for performing a method of monitoring data-usage information received from a dual-stack mobile device is provided. The media include, in a first IP version, establishing with the mobile device a first IP data session using a single authentication session, thereby enabling a first flow of data between the mobile device and a packet-routing component. Further, in a second IP version, the media include establishing with the mobile device a second IP data session using the single authentication session, thereby enabling a second flow of data between the mobile device and the receiving component. The media additionally includes until both of the first and second IP data sessions have been terminated, periodically gathering IP-session parameters that correspond to an establishment or a termination of the first or second IP data sessions, wherein the IP-session parameters include one or more of the following: a start time of the IP data session, a stop time of the IP data session, an IP address of the IP data session, or data-usage information corresponding to the IP data session. The media also includes incident to a termination of both the first and second IP data sessions, communicating a stop message to a receiving component that indicates that the single authentication session has been terminated.

In a further aspect, one or more computer-readable media having computer-useable instructions embodied thereon for performing a method of monitoring data-usage information received from a dual-stack mobile device is provided. The media include receiving a first set of IP-session parameters corresponding to a first IP data session that has been established in a first IP version using a single authentication session, and receiving a second set of IP-session parameters corresponding to a second IP data session that has been established in a second IP version using the single authentication session. Further, the media include receiving a third set of IP-session parameters corresponding to the second IP data session that has been terminated. The media additionally includes, upon receiving a stop message, which indicates that the single authentication session has terminated, utilizing the second and third sets of IP-session parameters to determine a value associated with the second IP data session, wherein the single authentication session has terminated when both of the first and second IP data sessions are terminated. Based on the value, the media include creating a report that includes an expression of the value.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
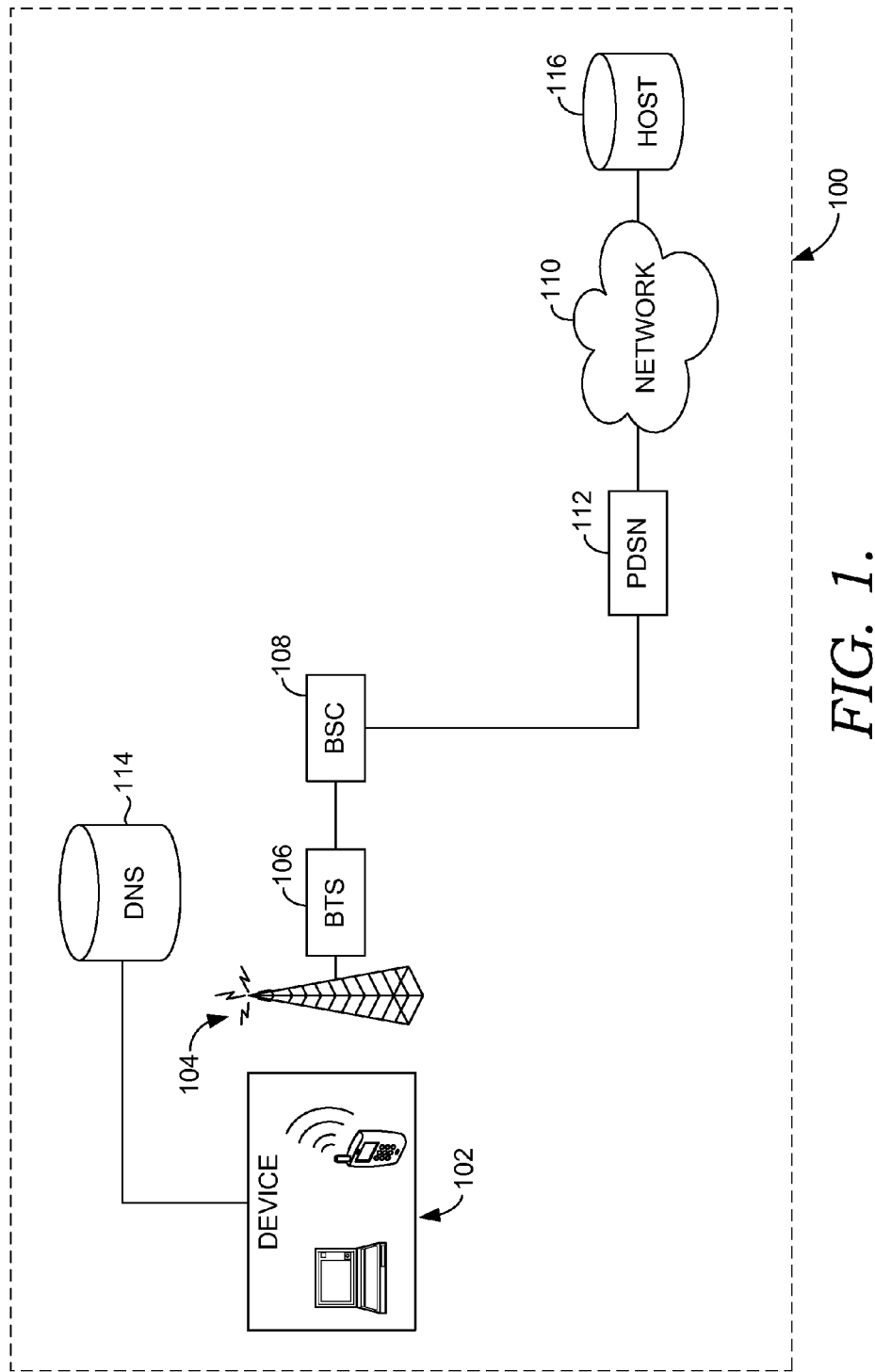
FIG. 1 is a schematic view of an exemplary communications environment suitable for use in implementing embodiments of the present invention.

The subject matter of the present invention is described with specificity herein to meet statutory requirements.

Although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Technology |
| 4G | Fourth-Generation Cellular Communication System |
| AAA | Authentication, Authorization, and Accounting |
| BSC | Base Station Controller |
| BTS | Base Transceiver Station |
| CD-ROM | Compact Disk Read Only Memory |
| CDMA | Code Division Multiple Access |
| DNS | Domain-Name System |
| DSL | Digital Subscriber Line |
| DVD | Digital Versatile Discs |
| EEPROM | Electrically Erasable Programmable Read Only Memory |
| FAX | Facsimile |
| GSM | Global System for Mobile Communications |
| IP | Internet Protocol |
| IPv4 | Internet Protocol Version 4 |
| IPv6 | Internet Protocol Version 6 |
| LAN | Local Area Network |
| MIPv4 | Mobile Internet Protocol Version 4 |
| PDA | Personal Digital Assistant |
| PDSN | Packet Data Serving Node |
| PPP | Point-to-Point Protocol |
| RAM | Random Access Memory |
| RNC | Radio Network Controller |
| ROM | Read Only Memory |
| TV | Television |
| TDMA | Time Division Multiple Access |
| WI-FI | Wireless Interface of Mobile Computing Devices |
| WIMAX | Worldwide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things, a method, system, or computer-program product. Accordingly, the embodiments may take the form of a hardware embodiment, or an embodiment combining software and hardware. In some embodiments, the present invention takes the form of a computer-program product that includes computer-useable instructions embodied on one or more computer-readable media.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, an exemplary network environment suitable for use in implementing embodiments of the present invention is illustrated and designated generally as reference numeral 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated. In the network environment 100, for a device 102 to communicate with a host 116, the device 102 may communicate with a domain name server (DNS) 114 to obtain an Internet Protocol (IP) address of the host 116. The DNS 114 translates host names, e.g., domain names, into host addresses, e.g., IP addresses.

The device 102 communicates over established radio frequencies through a cell tower 104 having a base transceiver station (BTS) 106, a number of which are typically connected to a base station controller (BSC) 108. The BTS 106 may communicate over a wireless air interface with one or more devices, such as device 102, located in the wireless coverage area. The communication between the BTS 106 and the device 102 may occur in a digital format, such as CDMA, TDMA, GSM, 3G, 4G, or 802.11x, or may occur in an analog format, such as AMPS. The BSC 108 manages the communication between a number of BTSs 106 and a limited number of devices 102 compatible with the network environment 100.

Host 116 refers to any computing device that has two-way access to other computer devices on a network, such as the Internet, LAN, any IP-based network, or other public packet data network. Computing device 102 or the computing device used as host 116 may include any device that performs one or more computing functions including, but not limited to, mobile phones, personal digital assistants (PDAs), televisions, laptops, desktop computers, facsimile machines (FAX), digital versatile disk (DVD) players, servers, e.g., a web server, or any other computing device.

The device 102 may communicate with one or more networks 110, such as the Internet or an IP-based network, via a packet data serving node (PDSN) 112. PDSN 112 is a component of a CDMA2000 mobile network, but any network may be used. In the case of a GSM or UMTS network, the GPRS Gateway Support Node (GGSN) performs similar functions as PDSN 112. PDSN 112 may act as the connection point between the Radio Access and IP networks and may be responsible for managing point-to-point protocol (PPP) sessions between the IP network provided by the mobile provider and a mobile device. It may also connect BSC 108 to network 110, and may act as a network access server, providing a device access to network 110. In many instances, PDSN 112 may act as an access gateway providing simple IP and mobile IP access, foreign agent support, and packet transport for virtual private networking. In addition, PDSN 112 may act as a client for Authentication, Authorization, and Accounting (AAA) servers and may provide mobile stations with a gateway to the IP network. Alternatively or additionally, the network environment 100 may include other network elements for providing device access to network 110. The device 102 communicates with the host 116 via the network 110.

Any network environment 100 having a network suitable for communicating between hosting devices, such as device 102 and host 116, may be utilized for implementing the present invention. Such a network environment 100 may, for example, utilize wireless technology or wired technology for network access. Wireless technology may include any wireless technology including, but not limited to 3G, 4G, WI-FI, WIMAX and the like. Wired technology includes, for example, wireline, DSL, and the like.

Figure 2:
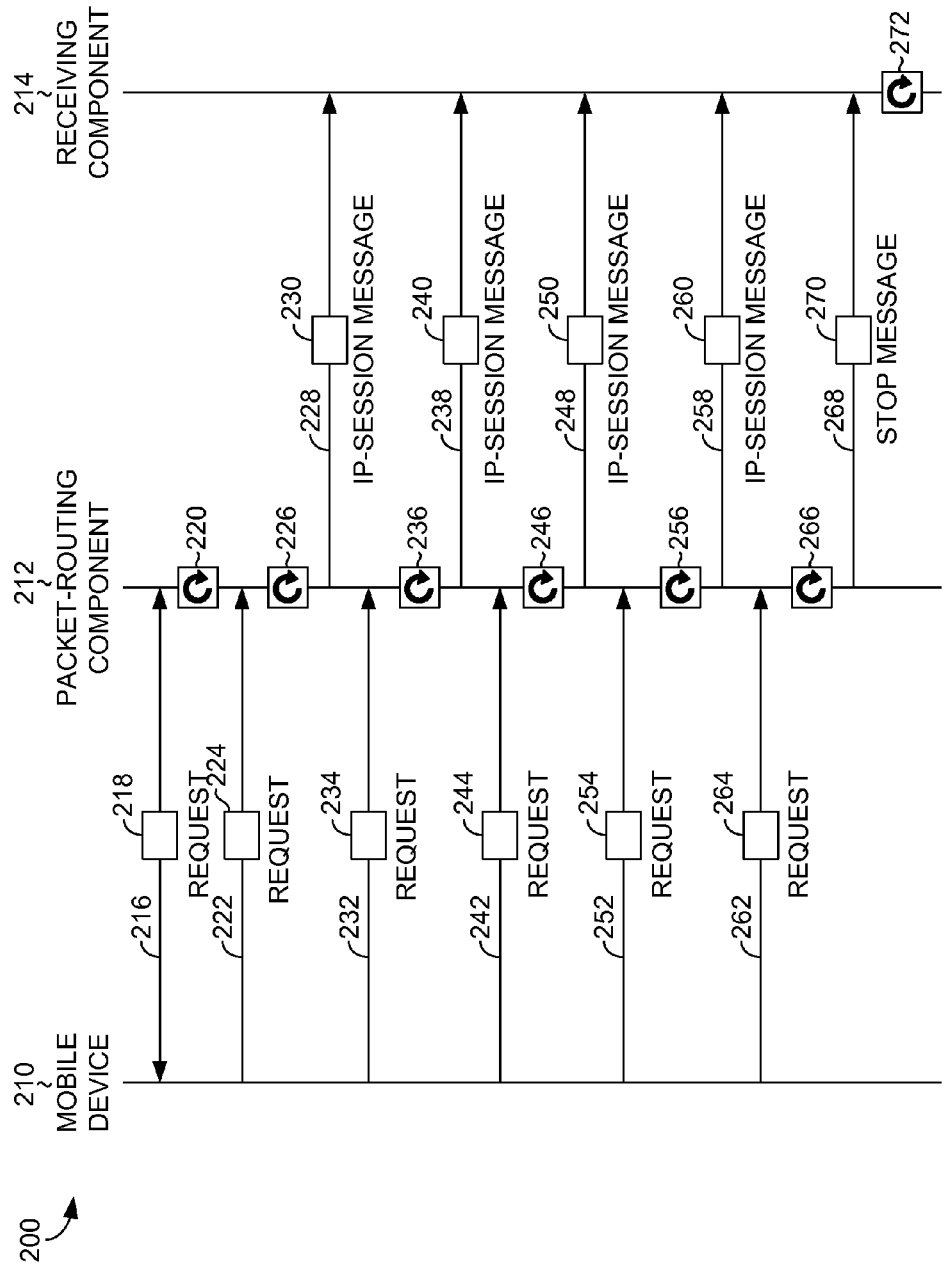
FIG. 2 depicts an illustrative flow diagram of a method for monitoring various IP data sessions by communicating a message to an authentication component incident to the establishment or termination of an IP data session, according to an embodiment of the present invention.

Turning now to FIG. 2, an illustrative flow diagram is shown of a method 200 for monitoring various IP data sessions by communicating a message to an authentication component incident to the establishment or termination of an IP data session, according to an embodiment of the present invention. Initially, a request 218 for an establishment of a first IP data session, here an IPv4 session, is sent 216 by the mobile device 210 to a packet-routing component 212 (e.g., PDSN). The packet-routing component 212 then establishes the IPv4 data session and monitors various components of the IP data session at step 220. In the embodiment of FIG. 2, an IPv4 data session is first established. It is contemplated, however, that another embodiment of the present invention would provide for an IPv6 data session to first be established. The only difference may be the authentication protocol used to authenticate the single session.

Authentication, as used herein, is a technique wherein the user gives credentials to the network so that the network may ensure the user's identity and also allows for accounting to be enabled so that the user may connect to the network and perform data transfers. Accounting, as used herein, refers to the process of monitoring data transfers so that the end user may be charged for the usage. IPv4 is the current generation of Internet Protocol, but for many reasons, including the prediction that we may run out of IPv4 addresses in the near future, IPv6 protocol has been developed to provide for an expanded address space.

IPv4 and IPv6, in many computing devices, may coexist. These computing devices are typically referred to as dual-stack devices, as they are able to process both IPv4 and IPv6 packets. Mobile communication devices, such as, but not limited to cell phones or PDAs may be mobile IP capable. Mobile IP allows a user with a mobile device whose IP address is associated with one network to stay connected when moving to a network that has a different IP address. The user keeps the same IP address, even when roaming between IP networks. Mobile IP technology is embedded in the functionality of packet equipment for 2.5G and 3G networks.

As is shown in FIG. 2, one or more IP data sessions, utilizing Internet protocol version 4 (IPv4) or Internet protocol version 6 (IPv6), may be established concurrently. In one embodiment, authentication and accounting for obtaining an IPv4 address and an IPv6 address may take place in separate streams, using more network resources than are necessary and causing the user time delays. This may occur even in mobile devices equipped with dual-stack technology, such as is described herein. For example, if an IPv4 session is first established, the device will be authenticated according to IPv4 authentication protocols. An IPv6 session may then be established on the device while the IPv4 session is still running on the device. In this embodiment, the IPv6 session may require a separate authentication process using IPv6 authentication protocols.

Another embodiment allows for a dual-stack mobile device to enable both IPv4 and IPv6 sessions simultaneously, but with a single instance of authentication and accounting. Combining authentication and accounting for more than one session of IPv4 and IPv6 into a single stream saves network overhead, allows for cleaner billing, and enhances user experience through reduction of time delays associated with the authentication process. Both embodiments are contemplated to be within the scope of the present invention. The embodiment of FIG. 2, however, encompasses the embodiment that allows for a mobile device to enable both IPv4 and IPv6 sessions simultaneously, with a single instance of authentication. As mentioned, a single instance of authentication conserves network resources, but does not allow for proper monitoring of each session such that a user of the mobile device can be properly billed for data-usage.

As previously mentioned, more than one IP session, including sessions for both IPv4 and IPv6, may be simultaneously enabled by a dual-stack mobile device with one authentication and accounting stream for all sessions. Depending on the IP version of the initial instantiation, authentication proceeds as required for that IP version. The next IP version that is used to establish an IP data session does not require a separate authentication process. In order to monitor each session (e.g., for billing purposes), messages may be sent from a network component, such as a packet-routing component (e.g., PDSN) to a receiving component (e.g., AAA server) after an IP data session, either IPv4 or IPv6, has been established or terminated.

In one embodiment, a message may be communicated to a receiving component, such as an authentication component (e.g., AAA server) immediately or soon after an IP data session has been established (e.g., brought up) or terminated (e.g., torn down). For example, if the first established session is an IPv4 session, and 10 minutes later an IPv6 session is established, a message will be sent to the authentication component incident to the establishment of the IPv6 session. Then, if that same IPv6 session is terminated, or torn down, 30 minutes later, a message will be sent to the authentication component incident to the termination of the IPv6 session. The establishment or termination of an IP data session triggers the communication of a message, or record, that is sent to the receiving component 214, such as an authentication component (e.g., AAA server).

Returning to FIG. 2, a request 224 for an IPv6 data session is sent 222 to the packet-routing component and the IPv6 data session is established at 226. Also at step 226, an IP-session message is prepared. Incident to the establishment of the IP data session, the IP-session message 230 is sent 228 to the receiving component 214, which in one embodiment, may be an authentication component (e.g., AAA server). The IP-session message for an established IP data session may include a variety of information, such as, but not limited to, a start time of the data session, an IP address of the data session, a framed IP address of the data session, data-usage information (e.g., bytes in, bytes out) corresponding to the data session, etc.

A request 234 is sent 232 to the packet-routing component 212 for a termination of the previously established IPv6 data session. The session is terminated at step 236, in addition to an IP-session message being prepared. The IP-session message 240 is communicated 238 to the receiving component 214, indicating that an IP data session has been terminated. This IP-session message, indicating a termination, may include information such as, but not limited to, a stop time of the data session, an IP address of the data session, a framed IP address of the data session, data-usage information (e.g., bytes in, bytes out) corresponding to the data session, etc.

An IP data session may now be established once again. A request 244 is sent 242 to the packet-routing component 212 for the establishment of an IPv6 data session. The session is established at step 246, along with the preparation of an IP-session message. The IP-session message 250 is sent 248 to the receiving component. The previously established IPv4 session may then be terminated. In this instance, a request 254 for the termination of the previously established IPv4 session is sent 254 to the packet-routing component 212, wherein the session is terminated and an IP-session message is prepared at step 256. The IP-session message 260 is communicated 258 to the receiving component 214. At this point, since a data session is presently established (e.g., IPv6 data session), the single authentication session is still running, even though the original IP data session, or the IPv4 session, has been terminated. Now, the IPv6 data session is the only remaining session.

Since the IPv6 data session is the only remaining session, the entire single authentication session terminates if the IPv6 data session terminates. A request 264 for the termination of the IPv6 session is sent 262 to the packet-routing component, and the IPv6 session is terminated at step 266, along with the preparation of a stop message. The stop message 270 is communicated 268 to the receiving component 214 indicating that there are no remaining IP data sessions. The stop message includes all information relevant to the termination of the single, shared authentication session, such as, but not limited to, a start time of the single authentication session (e.g., time that the first IP data session was established), and a stop time of the single authentication session (e.g., time that no IP data sessions were currently running). Other information may be included in a stop message and is contemplated to be within the scope of the present invention. At step 272, the stop message 270 is processed.

While the embodiment of FIG. 2 includes an IPv4 session as the first IP data session established, another embodiment may include an IPv6 session being the first IP data session established. Further, while the embodiment of FIG. 2 illustrates the establishment of an IPv4 session, then the establishment of an IPv6 session, then the termination of the IPv6 session, then the establishment of an IPv6 session, then the termination of the IPv4 session, and finally the termination of the IPv6 session, these steps are merely illustrative as to one embodiment of the present invention, and are not to be construed in a certain order. More or less IP data session establishment and termination events than are shown here are contemplated to be within the scope of the present invention. Further, different IP data session establishment and termination sessions are also contemplated to be within the scope of the present invention.

Figure 3:
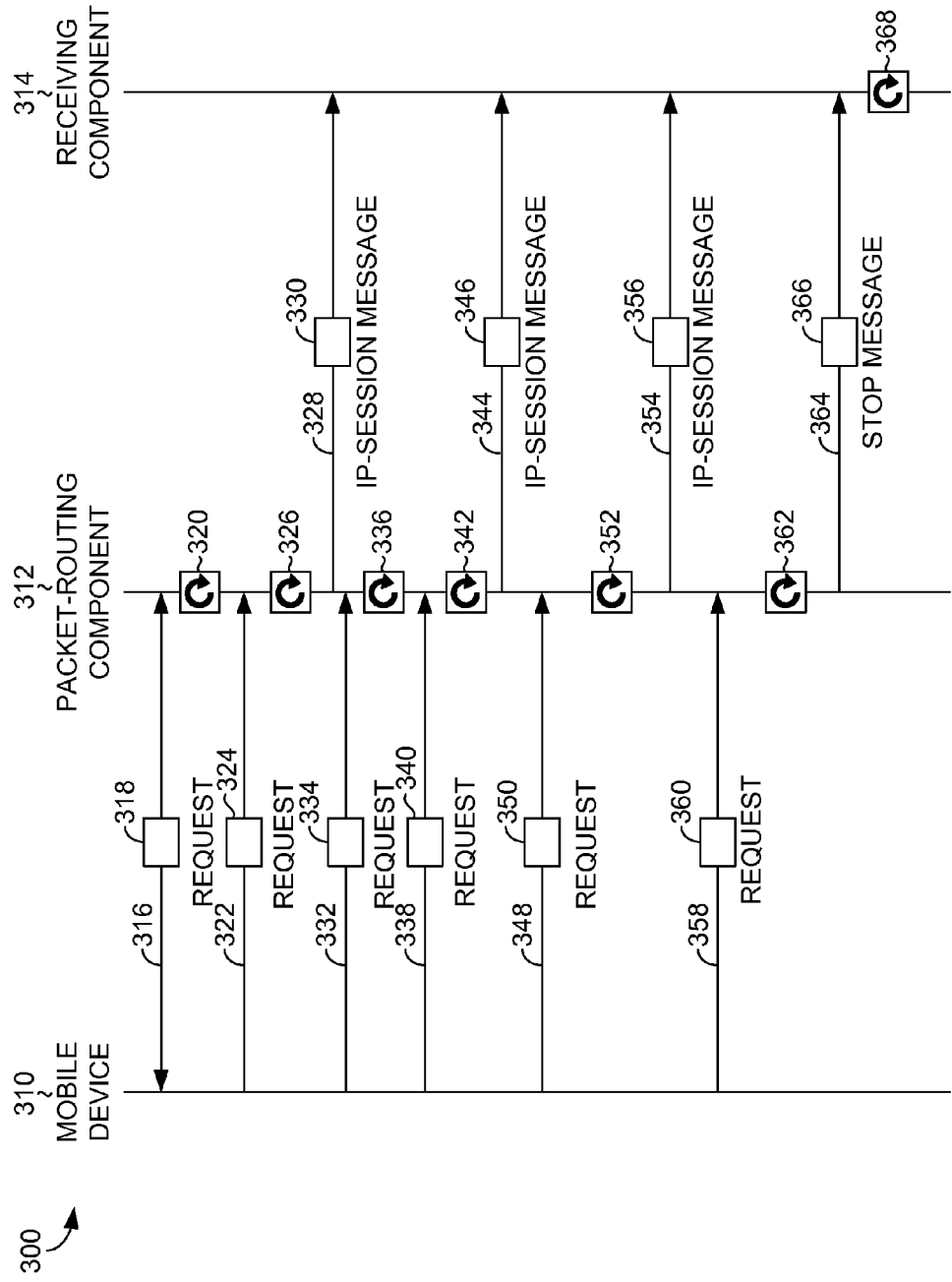
FIG. 3 is an illustrative flow diagram of a method for monitoring various IP data sessions by communicating a message to an authentication component on a predetermined time interval, according to an embodiment of the present invention.

FIG. 3 is an illustrative flow diagram of a method 300 for monitoring various IP data sessions by communicating a message to an authentication component on a predetermined time interval, according to an embodiment of the present invention. Similar to the embodiment of FIG. 2, various IP data sessions are established and terminated using the same authentication session (e.g., a single authentication session) until all IP data sessions have been terminated. Here, however, the IP-session messages are not sent to the receiving component immediately or soon after the establishment or termination of an IP data session. To the contrary, IP-session messages are sent to the receiving component periodically. In one embodiment, IP-session messages are sent, or communicated, on a regular time interval (e.g., every 10 seconds, every 15 seconds, every 30 seconds, every minute). In another embodiment, IP-session messages are sent on an irregular time interval, or an interval that may be predetermined but is not consistent or regular.

Initially, a request 318 for the establishment of a new IPv4 data session is sent 316 from the mobile device 310 and a packet-routing component 312. The IPv4 session is established at step 320. In the embodiment of FIG. 3, an IPv4 data session is first established. It is contemplated, however, that another embodiment of the present invention would provide for an IPv6 data session to first be established. The only difference may be the authentication protocol used to authenticate the single session.

A request 324 for the establishment of an IPv6 session is then sent 322 to the packet-routing component 312, such that the IPv6 session is established at step 326. Also at step 326, an IP-session message may be prepared but may not immediately be sent to the receiving component 314. As previously mentioned, IP-session messages, in the embodiment of FIG. 3, are sent to the receiving component on intervals, such as regular time intervals (e.g., every 15 seconds). The start time prior to the first IP-session message being sent to the receiving component 314 may be, in one embodiment, the time that the first IP data session was established.

As such, the IP-session message 330 is communicated 328 to a receiving component 314, such as an authentication component (e.g., AAA server), at a certain time interval, not incident to the establishment of the IPv6 data session. The IP-session message for an established IP data session may include a variety of information, such as, but not limited to, a start time of the data session, an IP address of the data session, a framed IP address of the data session, data-usage information (e.g., bytes in, bytes out) corresponding to the data session, etc.

A request 334 is sent 332 to the packet-routing component for the termination of the previously established IPv6 data session, and the IPv6 data session is terminated at step 336. As the time has not yet arrived for the communication of an IP-session message to the receiving component 314, it is not yet sent. Here, a request 340 is sent 338 to the packet-routing component for the establishment of an IPv6 data session, and the IPv6 data session is established at step 342. At this time, an IP-session message 346 is communicated 344 to the receiving component 314, as the next time interval has arrived. This time, the IP-session message 346 includes not only information about the IPv6 session terminated at step 336, but also includes information for the IPv6 session established at step 342, as both events occurred since the time the last IP-session message 330 was sent to the receiving component 314.

With continued reference to FIG. 3, a request 350 is sent 348 to the packet-routing component for the termination of the previously established IPv4 session. The IPv4 session is terminated at step 352. The IP-session message 356 is communicated 354 to the receiving component at the next time interval, which, here, includes only information about the termination of the IPv4 session, which occurred at step 352. Lastly, a request 360 is sent 358 to the packet-routing component for the termination of the previously established IPv6 session. The IPv6 session is terminated at step 362, and now, all IP data sessions have been terminated, indicating that the single authentication session has also been terminated. A stop message 366 is communicated 364 to the receiving component 314, indicating that all IP data sessions have been terminated. The stop message 366 is processed at 368.

While the embodiment of FIG. 3 includes an IPv4 session as the first IP data session established, another embodiment may include an IPv6 session being the first IP data session established. Further, while the embodiment of FIG. 3 illustrates the establishment of an IPv4 session, then the establishment of an IPv6 session, then the termination of the IPv6 session, then the establishment of an IPv6 session, then the termination of the IPv4 session, and finally the termination of the IPv6 session, these steps are merely illustrative as to one embodiment of the present invention, and are not intended to be construed in a certain order. More or less IP data session establishment and termination events are contemplated to be within the scope of the present invention. Further, different IP data session establishment and termination events are also contemplated to be within the scope of the present invention.

Figure 4:
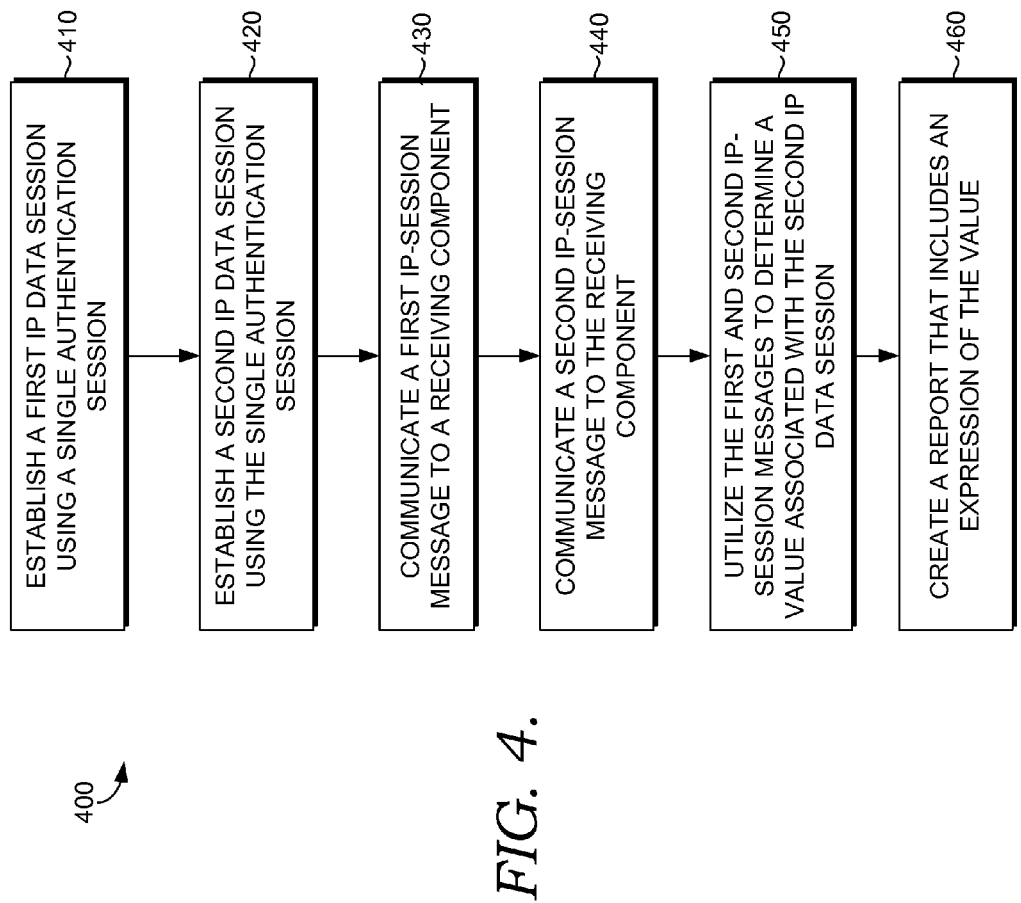
FIG. 4 is an illustrative flowchart of a method for monitoring data-usage information received from a dual-stack mobile device, according to an embodiment of the present invention.

Referring now to FIG. 4, an illustrative flowchart is shown of a method 400 for monitoring data-usage information received from a dual-stack mobile device, according to an embodiment of the present invention. Initially, at step 410, a first IP data session is established using a single authentication session. This first IP data session is established in a first IP version, such as either IPv4 or IPv6, and allows for an enablement of a first flow of data between the mobile device and a packet-routing component, such as the packet-routing component 212 or 312, illustrated in FIGS. 2 and 3. A second IP data session is established at step 420, also using the single authentication session. The second IP data session is established in a second IP version, which enables a second flow of data between the mobile device and the packet-routing component. In one embodiment, the first and second IP versions are different. For example, the first IP version may be IPv4 and the second may be IPv6, or vice versa.

As previously mentioned, both the first and second IP data sessions are established using a single authentication session, such that the second IP data session does not require a separate authentication process even if it is established in a different IP version than the first IP data session. This allows for a single session and just one authentication process. Typically, the single authentication session terminates when all IP data sessions have been terminated, which is further explained herein. In one embodiment, the single authentication session is established using an authentication process or method that corresponds to the first IP version.

At step 430, incident to establishing the second IP data session, a first IP-session message is communicated to a receiving component, such as the receiving component 214 or 314 in FIGS. 2 and 3 (e.g., AAA server). The receiving component (e.g., AAA server) may monitor IP-session messages associated with IP data sessions. In the embodiment of FIG. 4, the IP-session message is communicated immediately or shortly after the second IP data session was established. In one embodiment, each IP-session message contains information about a single establishment or termination event. The IP-session message for an established IP data session, such as the second IP data session, may include a variety of information, such as, but not limited to, a start time of the data session, an IP address of the data session, a framed IP address of the data session, data-usage information (e.g., bytes in, bytes out) corresponding to the data session, etc.

Incident to a termination of the second IP data session, a second IP-session message is communicated to the receiving component at step 440. As was the case with step 430, the IP-session message may be communicated or sent immediately or shortly after the termination of the second IP data session and may include information pertaining only to the terminated second IP data session. This IP-session message, indicating a termination of an IP data session, may include information such as, but not limited to, a stop time of the data session, an IP address of the data session, a framed IP address of the data session, data-usage information (e.g., bytes in, bytes out) corresponding to the data session, etc.

The first and second IP-session messages are now used (e.g., by the receiving component), shown at step 450, to determine a value associated with the second IP data session. In one embodiment, the value is a monetary value that represents a cost incurred by a user of the mobile device. This incurred cost may be associated with the second IP data session and may be calculated using information such as the start and stop times of the data session, or data-usage, such as bytes in and bytes out. In other embodiments, the value associated with the second IP data session is not a monetary value. At step 460, based on the value, a report is created that includes an expression of the value. In the embodiment of the value representing a monetary value, the report may include an invoice sent to the user of the mobile device indicating the monetary value owed by the user to the service provider. In other embodiments, the report, however, may not indicate a monetary value at all, and may include an expression of another type of value.

As previously discussed, the single authentication session may terminate once all IP data sessions have been terminated. As such, incident to a termination of both the first and second IP data sessions, a stop message may be communicated to the receiving component indicating that the single communication session has terminated. The stop message may include all information relevant to the termination of the single authentication session, such as, but not limited to, a start time of the single authentication session (e.g., time that the first IP data session was established), and a stop time of the single authentication session (e.g., time that no IP data sessions were currently running). Other information may be included in a stop message and is contemplated to be within the scope of the present invention.

In one embodiment, prior to the termination of the single authentication session, a third IP data session may be established using either the first or second IP version. Here, since the second IP data session has been terminated, the third IP data session may be established using the same IP version as the second IP data session used. For instance, if the second IP data session was established using IPv6, the third IP data session may also be established using IPv6. Here, a third flow of data is enabled between the mobile device and the packet-routing component. Incident to establishing the third IP data session, a third IP-session message is communicated to the receiving component. The third IP data session may now be terminated, and incident to the termination of the third IP data session, a fourth IP-session message may be communicated to the receiving component such that the receiving component can utilize the third and fourth IP-session messages to determine the value associated with the third IP data session, similar to that described above in relation to the second IP data session.

Figure 5:
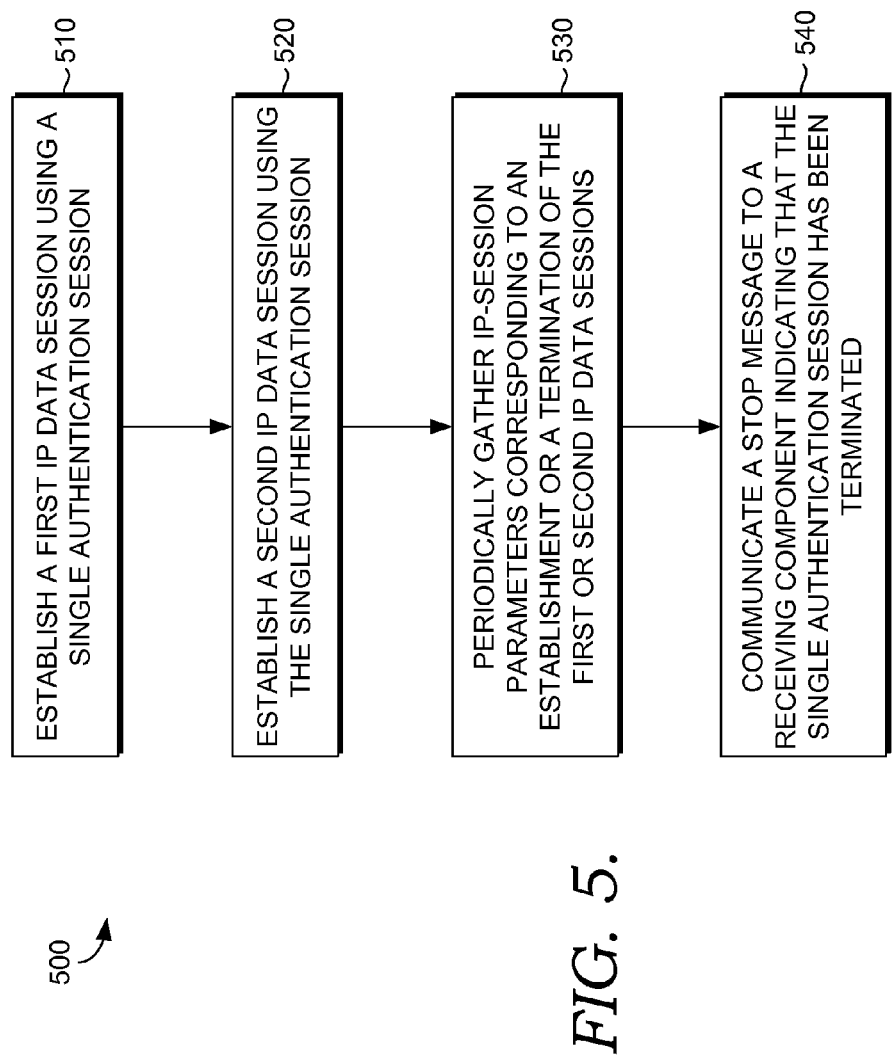
FIG. 5 is an illustrative flowchart of a method for monitoring data-usage information received from a dual-stack mobile device, according to an embodiment of the present invention.

FIG. 5 shows an illustrative flowchart of a method 500 for monitoring data-usage information received from a dual-stack mobile device, according to an embodiment of the present invention. Initially, a first IP data session is established at step 510 using a single authentication session. The first IP data session may be established in a first IP version, such as either IPv4 or IPv6, which enables a first flow of data between the mobile device and a packet-routing component, such as the packet-routing component 212 or 312 of FIGS. 2 and 3. At step 520, a second IP data session is established using the single authentication session and may be established in a second IP version thus enabling a second flow of data between the mobile device and the packet-routing component. In one embodiment, the first and second IP versions are different, such as IPv4 and IPv6. For instance, if the first IP version is IPv6, the second may be IPv4.

As previously discussed, both the first and second IP data sessions are established using a single authentication session, such that the second IP data session does not require a separate authentication process even if it is established in a different IP version than the first IP data session. This allows for a single session and just one authentication process. Typically, the single authentication session terminates when all IP data sessions have been terminated, which is further explained herein. In one embodiment, the single authentication session is established using an authentication process or method that corresponds to the first IP version.

With continued reference to FIG. 5, at step 530, until both of the first and second IP data sessions have been terminated, IP-session parameters are periodically gathered. The IP-session parameters may correspond to an establishment or a termination of the first or second IP data sessions, and may include, but are not limited to, a start time of the IP data session, a stop time of the IP data session, an IP address or a framed IP address of the IP data session, or data-usage information corresponding to the IP data session. The IP-session parameters may be periodically gathered at various intervals of time. In one embodiment, the parameters are gathered on regular intervals, such as every 10 seconds, every 15 seconds, every 30 seconds, etc. In another embodiment, the parameters may be gathered on a predetermined time basis, but the intervals may be irregular, unlike every 15 seconds, for example. The IP-session parameters may then be communicated to the receiving component.

Similar to that described above with respect to periodically gathering IP-session parameters, the parameters may be communicated to the receiving component on a regular basis, or an irregular basis. In one embodiment, the parameters are communicated (e.g., in an IP-session message) on a regular time interval, such as every 10 seconds, every 15 seconds, every 30 seconds, etc. In this instance, the IP-session message may include parameters for more than one establishment or termination event, thereby including all parameters from any events that have occurred since the last time an IP-session message was communicated to the receiving component. In another embodiment, however, the IP-session message may be communicated on an irregular basis, although the times for sending the messages may be predetermined.

At step 540, incident to a termination of both the first and second IP data sessions, a stop message is communicated to a receiving component indicating that the single authentication session has been terminated. The stop message may include all information relevant to the termination of the single authentication session, such as, but not limited to, a start time of the single authentication session (e.g., time that the first IP data session was established), and a stop time of the single authentication session (e.g., time that no IP data sessions were currently running). Other information may be included in a stop message and is contemplated to be within the scope of the present invention. In one embodiment, an IP data session is terminated upon the mobile device being out of range, a timed-out session, or a termination by a user of the device, such as the user choosing to close a particular website.

The receiving component, in one instance, is an AAA server that monitors and uses the IP-session parameters to bill a user of the mobile device for a particular IP data session. For instance, a value associated with the second IP data session may be determined by the IP-session parameters sent to the receiving component. In one embodiment, the value is a monetary value representing a cost incurred by a user of the mobile device as a result of the second IP data session. A report may be created based on the value that includes an expression of the value. In some embodiments, the value is not a monetary value, but represents another aspect of the IP data session.

Figure 6:
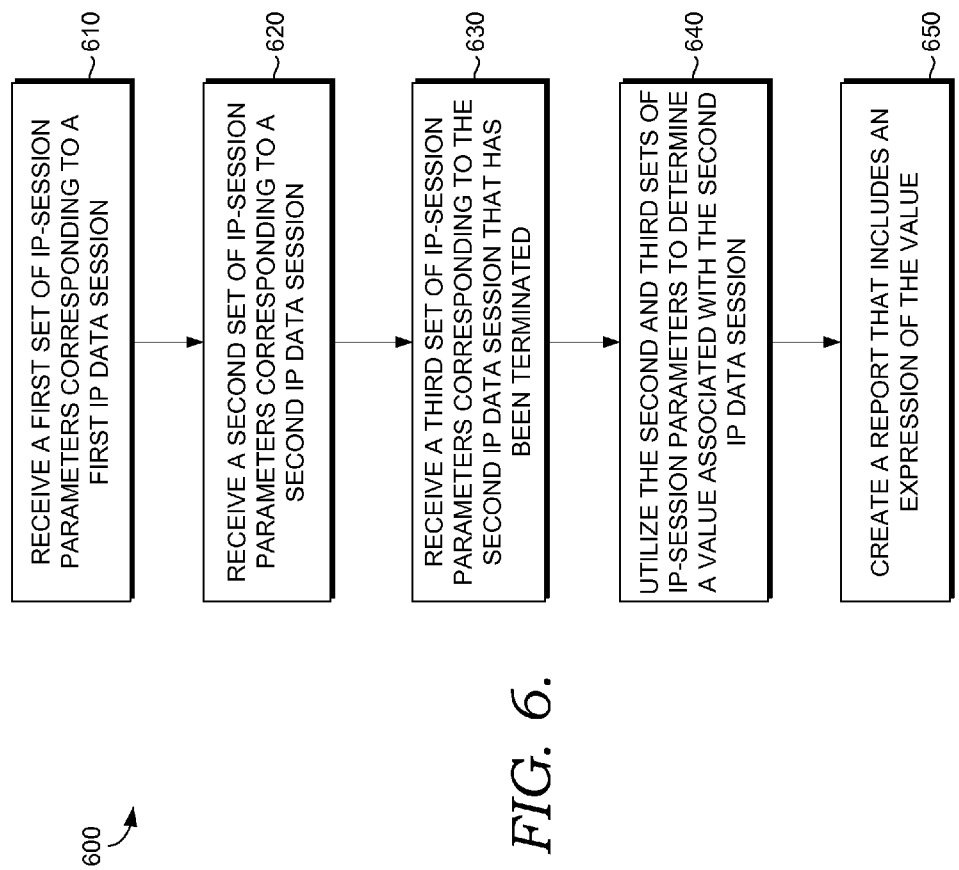
FIG. 6 is an illustrative flowchart of a method for monitoring data-usage information received from a dual-stack mobile device, according to an embodiment of the present invention.

Turning to FIG. 6, an illustrative flowchart is shown of a method 600 for monitoring data-usage information received from a dual-stack mobile device, according to an embodiment of the present invention. Initially, a first set of IP-session parameters corresponding to a first IP data session is received at step 610. The first IP data session may be established in a first IP version using a single authentication session. At step 620, a second set of IP-session parameters corresponding to a second IP data session is received, this data session being established in a second IP version using the single authentication session. As previously described, the first and second IP versions may be different in some embodiments, wherein the first IP version may be IPv4 and the second may be IPv6, or vice versa. Further, the two IP data sessions may be established using a single authentication session, thus removing the need for the second IP data session to be separately authenticated.

At step 630, a third set of IP-session parameters is received, the third set corresponding to the second IP data session that has been terminated. Upon receiving a stop message, the second and third sets of IP-session parameters are utilized at step 640 to determine a value associated with the second IP data session. The stop message indicates that the single authentication session has terminated, which occurs when both the first and second IP data sessions, and any others that have been established using the single authentication session, are terminated. At step 650, based on the value, a report is created that includes an expression of the value. In one embodiment, the value is a monetary value representing a cost incurred by a user of the mobile device as a result of the second IP data session. Multiple values may be determined, depending on the number of IP data sessions established and terminated during the existence of the single authentication session. In another embodiment, the value is not monetary but represents some other aspect of the second IP data session.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of monitoring data-usage information received from a dual-stack mobile device, the method comprising:
   in a first Internet Protocol (IP) version, establishing with the mobile device a first Internet Protocol (IP) data session using a single authentication session, thereby enabling a first flow of data between the mobile device and a packet-routing component, wherein the single authentication session is established using an authentication process or method that corresponds to the first IP version;
   in a second Internet Protocol (IP) version, establishing with the mobile device a second Internet Protocol (IP) data session using the single authentication session, thereby enabling a second flow of data between the mobile device and the packet-routing component, wherein the first and second IP versions are different;
   incident to establishing the second IP data session, communicating a first IP-session message to a receiving component;
   incident to a termination of the second IP data session, communicating a second IP-session message to the receiving component;

utilizing the first and second IP-session messages to determine a value associated with the second IP data session; and based on the value, creating a report that includes an expression of the value.

2. The media of claim 1, wherein the first IP version is IP version 4 (IPv4) and the second IP version is IP version 6 (IPv6).

3. The media of claim 1, wherein the first IP version is IPv6 and the second IP version is IPv4.

4. The media of claim 1, wherein the single authentication session is established using an authentication method corresponding to the first IP version.

5. The media of claim 1, wherein the first IP-session message includes information corresponding to an establishment of the second IP session, including one or more of a start time, an IP address, a framed IP address, or data-usage information.

6. The media of claim 1, wherein the second IP-session message includes information corresponding to a termination of the second IP session, including one or more of a stop time, an IP address, a framed IP address, or data-usage information.

7. The media of claim 1, further comprising incident to a termination of both the first and second IP data sessions, communicating a stop message to the receiving component indicating that the single communication session has terminated.

8. The media of claim 1, wherein the value is a monetary value representing a cost incurred by a user of the mobile device as a result of the second IP data session.

9. The media of claim 1, wherein the receiving component is an Authentication, Authorization, and Accounting (AAA) server that monitors IP-session messages associated with IP data sessions.

10. The media of claim 1, further comprising:
in the second IP version, establishing with the mobile device a third IP data session using the single authentication session, thereby enabling a third flow of data between the mobile device and the packet-routing component;
incident to establishing the third IP data session, communicating a third IP-session message to the receiving component;
terminating with the mobile device the third IP data session; and
incident to terminating the third IP data session, communicating a fourth IP-session message to the receiving component such that the receiving component can utilize the third and fourth IP-session messages to determine the value associated with the third IP data session.

11. One or more non-transitory computer-readable storage media having computer-useable instructions embodied thereon for performing a method of monitoring data-usage information received from a dual-stack mobile device, the method comprising:
in a first Internet Protocol (IP) version, establishing with the mobile device a first Internet Protocol (IP) data session using a single authentication session, thereby enabling a first flow of data between the mobile device and a packet-routing component, wherein the single authentication session is established using an authentication process or method that corresponds to the first IP version;
in a second Internet Protocol (IP) version, establishing with the mobile device a second Internet Protocol (IP) data session using the single authentication session, thereby enabling a second flow of data between the mobile device and the receiving component, wherein the first and second IP versions are different;
until both the first and second IP data sessions have been terminated, periodically gathering IP-session parameters that correspond to an establishment or a termination of the first or second IP data sessions, wherein the IP-session parameters include one or more of the following,
(1) a start time of the first or second IP data sessions,
(2) a stop time of the first or second IP data sessions,
(3) an Internet Protocol (IP) address of the first or second IP data sessions, or
(4) data-usage information corresponding to the first or second IP data sessions; and
incident to a termination of both the first and second IP data sessions, communicating a stop message to a receiving component that indicates that the single authentication session has been terminated.

12. The media of claim 11, further comprising communicating the gathered IP-session parameters to the receiving component.

13. The media of claim 12, wherein the gathered IP-session parameters are communicated to the receiving component on a fifteen second time interval.

14. The media of claim 13, wherein the receiving component is an Authentication, Authorization, and Accounting (AAA) server that monitors and uses the IP-session parameters to bill a user of the mobile device for a particular IP data session.

15. The media of claim 12, wherein the IP-session parameters are utilized by the receiving component to determine a value associated with the second IP data session.

16. The media of claim 15, wherein the receiving component creates a report based on the value that includes an expression of the value.

17. The media of claim 16, wherein the value is a monetary value representing a cost incurred by a user of the mobile device as a result of the second IP data session.

18. The media of claim 11, wherein the first or second IP data sessions are terminated upon an occurrence of one or more of the mobile device being out of range, a timed-out session; or a termination by a user of the mobile device.

19. One or more non-transitory computer-readable storage media having computer-useable instructions embodied thereon for performing a method of monitoring data-usage information received from a dual-stack mobile device, the method comprising:
receiving a first set of Internet Protocol (IP)—session parameters corresponding to a first Internet Protocol (IP) data session that has been established in a first Internet Protocol (IP) version using a single authentication session, wherein the single authentication session is established using an authentication process or method that corresponds to the first IP version;
receiving a second set of Internet Protocol (IP)—session parameters corresponding to a second Internet Protocol (IP) data session that has been established in a second Internet Protocol (IP) version using the single authentication session, wherein the first and second IP versions are different;
receiving a third set of IP-session parameters corresponding to the second IP data session that has been terminated;
upon receiving a stop message, which indicates that the single authentication session has terminated, utilizing the second and third sets of IP-session parameters to determine a value associated with the second IP data session, wherein the single authentication session has terminated when both of the first and second IP data sessions are terminated; and based on the value, creating a report that includes an expression of the value.

20. The media of claim 19, wherein the value is a monetary value representing a cost incurred by a user of the mobile device as a result of the second IP data session.

* * * * *